United States Patent
Van Dijk et al.

(10) Patent No.: US 9,480,123 B2
(45) Date of Patent: Oct. 25, 2016

(54) LED RETROFIT LAMP

(71) Applicant: KONINKLIJKE PHILIPS N.V., Eindhoven (NL)

(72) Inventors: Bernhard Christiaan Van Dijk, Geldrop (NL); Haimin Tao, Eindhoven (NL); Borong Su, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/903,389

(22) PCT Filed: Aug. 18, 2014

(86) PCT No.: PCT/EP2014/067541
§ 371 (c)(1),
(2) Date: Jan. 7, 2016

(87) PCT Pub. No.: WO2015/028329
PCT Pub. Date: Mar. 5, 2015

(65) Prior Publication Data
US 2016/0174326 A1 Jun. 16, 2016

(30) Foreign Application Priority Data
Aug. 29, 2013 (EP) ..................... 13182259

(51) Int. Cl.
*H01J 7/44* (2006.01)
*H05B 33/08* (2006.01)

(52) U.S. Cl.
CPC ................ *H05B 33/0884* (2013.01)

(58) Field of Classification Search
CPC ....... F21Y 2103/003; F21K 9/10; F21K 9/17
USPC ..................... 315/51, 74, 209 CD, 291, 362; 362/217.01, 257, 311.02
See application file for complete search history.

(56) References Cited

U.S. PATENT DOCUMENTS

| | | | |
|---|---|---|---|
| 3,365,625 A | 1/1968 | Pearse | |
| 8,147,091 B2 * | 4/2012 | Hsia | F21V 25/04 362/218 |
| 8,322,878 B2 * | 12/2012 | Hsia | H01R 33/945 362/218 |
| 8,339,761 B2 | 12/2012 | Yamada et al. | |
| 8,459,831 B2 * | 6/2013 | Hsia | F21K 9/17 362/217.1 |
| 8,749,167 B2 * | 6/2014 | Hsia | F21V 25/00 315/209 R |
| 2007/0253137 A1 | 11/2007 | Maloney | |
| 2011/0187271 A1 | 8/2011 | Bouws et al. | |

(Continued)

FOREIGN PATENT DOCUMENTS

| | | |
|---|---|---|
| EP | 2366948 A2 | 9/2011 |
| EP | 2381158 A1 | 10/2011 |
| EP | 2602544 A1 | 6/2013 |

(Continued)

*Primary Examiner* — Thuy Vinh Tran

(57) ABSTRACT

The present invention relates to an LED retrofit lamp adapted for operation with an alternating current. The LED lamp comprises an LED unit, first and second switching devices (e.g., first and second relays), a startup voltage supply unit (1010) coupled in parallel to the first switching device, an ignition detection unit (1020) coupled in parallel to the second switching device, and a switch drive unit (1030) for setting the first and second switching devices to a conducting state. If one of the first and second switching devices is shorted either no startup supply voltage or no detection signal is provided, such that the failure is indicated externally to a user.

14 Claims, 8 Drawing Sheets

(56) References Cited

U.S. PATENT DOCUMENTS

2012/0062114 A1 3/2012 Chang
2013/0147350 A1 6/2013 Yang

FOREIGN PATENT DOCUMENTS

| WO | 2009067074 A1 | 5/2009 |
| WO | 2012127371 A1 | 9/2012 |

* cited by examiner

LED RETROFIT LAMP

CROSS-REFERENCE TO PRIOR APPLICATIONS

This application is the U.S. National Phase application under 35 U.S.C. §371 of International Application No. PCT/EP2014/067541, filed on Aug. 18, 2014, which claims the benefit European Patent Application No. 13182259.5, filed on Aug. 29, 2013. These applications are hereby incorporated by reference herein.

FIELD OF THE INVENTION

The invention relates to an LED retrofit lamp and to a method of operating an LED retrofit lamp with an alternating current.

BACKGROUND OF THE INVENTION

WO2012127371A1 discloses an electric lamp having two pairs of external connection pins adapted for connecting the lamp to a voltage source for powering an internal lighting module. Each pair of pins is disconnected from the lighting module by an open switch unless a non-zero electric voltage is applied to the pair and causes the switch to close. The lamp may be fitted in a switch-start fixture, providing an ohmic connection between two pins in different pairs, as well as a rapid-start fixture, with a capacitive connection.

Further measures might become necessary in order to meet increasing safety requirements for LED retrofit lamps.

SUMMARY OF THE INVENTION

It is an object of the present invention to provide an LED retrofit lamp meeting reinforced insulation requirements. It is a further object of the present invention to provide a corresponding method of operating an LED retrofit lamp.

In a first aspect of the invention, there is provided an LED retrofit lamp adapted for operation with an alternating current. The LED lamp comprises
   an LED unit,
   a first switching device and a second switching device, said first switching device, said second switching device, and said LED unit being connected in series;
   a startup voltage supply unit coupled in parallel to said first switching device, said startup voltage supply unit adapted to generate a startup supply voltage if the first switching device is in a non-conducting state;
   an ignition detection unit coupled in parallel to said second switching device, said ignition detection unit adapted to generate a detection signal if the second switching device is in a non-conducting state; and
   a switch drive unit adapted to provide said startup supply voltage to said first and second switching devices, in response to said detection signal, wherein said first and second switching devices are adapted to assume a conducting state upon receipt of said startup supply voltage.

The first and second switching devices may be, e.g., electrically operated switches, such as relays. Before insertion of the LED retrofit lamp into the lamp fixture, or before connecting the lamp to power, both switching devices are preferably in a non-conducting state. Accordingly, the two ends of the TL tube are isolated from each other, because no current may flow through the switching devices on the lamp's mains current line as long as the switching devices are non-conducting. The ignition detection unit is adapted to detect an HF signal, which is, e.g., applied to a mains current line of the LED lamp. That is, upon inserting both ends of the TL tube into an electric fixture, an ignition voltage is detected, e.g., on the mains current line. Based on the occurrence of an ignition voltage on the mains current line, the switch drive unit may then cause the first and second switching devices to change from a non-conducting state to a conducting state. Only after the first and second switching devices have been set to a conducting state, current may flow through the first and second switching devices on the mains current line and the lamp may be illuminated. If on the other hand, only one end of the tube lamp is inserted into the fixture, in most cases no HF signal is generated by the ballast and in some cases no regular or sufficient HF signal is provided on the mains current line, and the first and second switching devices remain non-conducting. That is to say, some ballast generates some ignition voltage in the situation when the lamp is connected to the "hot" side of the ballast output, but such ignition voltage will only last for a short time. Accordingly, safety is ensured when installing an LED retrofit lamp according to the first aspect of the invention. The switch drive unit may set the first and second switching devices to a conducting state by supplying the startup supply voltage. In particular, if the first and second switching devices comprise respective first and second relays, the switch drive unit may set the first and second relays to a conducting state, e.g., by providing the startup supply voltage to the relay coil, in turn switching the relay contact such that the relay closes (i.e., becomes conducting).

In principle, having two switching devices rather than only one switching device already provides for improved safety because, if one of the switching devices fails (e.g., such that the switching device becomes stuck in a conducting state), the other switching device still provides basic insulation. The first aspect of the present invention provides for the additional advantage that the lamp will indicate the failure upon the next startup. Setting the first and second switching devices into a conducting state requires the startup supply voltage on the one hand and the detection signal on the other hand. If the first switching device has failed (e.g., has become stuck) and remains conducting, no startup supply voltage is generated. This is due to the startup voltage supply unit being coupled in parallel to the first switching device. In other words, if the first switching device fails (e.g., if the first switching device comprises a stuck relay), the startup supply voltage unit is bypassed by the first switching device such that no startup supply voltage can be provided to the first and second switching devices. In the case that the first switching device is stuck in a conducting state, the lamp will still not function, because the switch drive unit does not set the second switching device to a conducting state (because no startup supply voltage is provided to the second switching device). If, on the other hand, the second switching device has failed and remains conducting, no detection signal is generated. This is due to the ignition detection unit being coupled in parallel to the second switching device. In other words, if the second switching device fails (e.g., if the second switching device comprises a stuck relay), the ignition detection unit is bypassed by the second switching device such that no detection signal can be provided to the switch drive unit. In the case that the second switching device is stuck in a conducting state, the lamp will not function, because the switch drive unit does not set the first switching device to a conducting state (because the ignition detection unit does not provide a detection signal to the switch drive unit, and therefore, no startup supply voltage is provided to the first switching device).

The lamp is adapted for operation with an alternating current, such as for example provided by a 50/60 Hz mains supply line via a suitable power supply unit, e.g., a ballast unit of a lamp fixture.

The LED unit may preferably comprise any type of solid state light source, such as an inorganic LED, organic LED, or a solid state laser, e.g., a laser diode. For general lighting applications, the LED unit may preferably comprise at least one high-power LED, i.e., having a luminous flux of more than 1 lm. For retrofit applications, it is especially preferred that the total flux of the LED unit is in the range of 300 lm to 10000 lm, which corresponds to a typical 5 W to 80 W fluorescent tube lamp. Most preferably, the forward voltage of the LED unit is in the range of 30 V to 200 V, particularly 50 V to 100 V for a 4-foot lamp (1 foot=0.3048 m).

The LED unit may certainly comprise further electric or electronic components, such as an LED driver unit, e.g. to set the brightness and/or color, rectifying circuitry, a smooting stage, a filter capacitor and/or a discharging protection diode. The LED unit may comprise more than one LED, for example in applications where colour-control of the emitted light is desired, e.g. using RGB-LEDs, or to further increase the luminous flux of the LED lamp. Furthermore, the LED lamp may comprise more than one LED unit.

The first and second switching devices may be of any suitable type to be recurrently controlled to the conducting and non-conducting state. As will be discussed in the following, at least one of the states can be set by the control unit. The first and second switching devices should in addition be adapted to the electrical specifications of the application in terms of maximal voltage and current.

The LED lamp may be adapted to be connected to a PL-type fluorescent lamp fixture. However, preferably, the LED lamp comprises at least a first and second lamp cap. The lamp caps should be adapted to provide an electrical connection of the LED unit and the compensation circuit with the respective fixture and thus with power. The lamp caps may thus for example be provided with a corresponding contact element, such as a bi-pin base. For example, the lamp caps may have the electrical and/or mechanical properties of a T5 or T8-fluorescent lamp.

Preferably, the LED lamp is an LED tube lamp, such as a linear tube lamp. Most preferably, the LED lamp is a double-capped tube lamp, e.g. having a first and second lamp cap, arranged on opposing ends of a housing.

According to a preferred embodiment, said LED lamp further comprises a mains current line, said first switching device, said second switching device, and said LED unit being connected in series along said mains current line; said ignition detection unit adapted to generate said detection signal in response to detecting an ignition voltage on said mains current line. Accordingly, the two ends of the TL tube are isolated from each other, because no current may flow through the switching devices on the mains current line as long as the switching devices are non-conducting. The ignition detection unit is adapted to detect an HF signal applied to the mains current line. That is, upon inserting both ends of the TL tube into an electric fixture, an ignition voltage on the mains current line is detected. Based on the occurrence of an ignition voltage on the mains current line, the switch drive unit may then cause the first and second switching devices to change from a non-conducting state to a conducting state. Only after the first and second switching devices have been set to a conducting state, current may flow through the first and second switching devices on the mains current line and the lamp may be illuminated. If on the other hand, only one end of the tube lamp is inserted into the fixture, in most cases no HF signal is generated by the ballast and in some cases no regular or sufficient HF signal is provided on the mains current line, and the first and second switching devices remain non-conducting. That is to say, some ballast generates some ignition voltage in the situation when the lamp is connected to the "hot" side of the ballast output, but such ignition voltage will only last for a short time. Accordingly, safety is ensured when installing an LED retrofit lamp according to the first aspect of the invention.

According to a further preferred embodiment, said LED unit further comprises a steady-state voltage supply unit. The steady-state voltage supply unit is adapted to generate a steady-state supply voltage. The steady-state voltage supply unit is further adapted to derive a steady-state supply voltage for said first and second switching devices from a mains current line of said LED lamp. The first and second switching devices may be maintained in a conducting state, e.g., by providing the steady-state supply voltage to the first and second switching devices. During steady-state operation, the steady-state supply voltage may be derived, e.g., based on the mains current on the mains current line. In case the first and second switching devices comprise first and second relays, the steady-state supply voltage may be provided to the respective coils in order to keep the first and second relays closed.

According to a further preferred embodiment, the steady-state voltage supply unit is further adapted to set said first and second switching devices at least temporarily to a non-conducting state in response to a power reduction on a mains current line of said LED lamp. Thus, upon disconnecting one end of the TL tube lamp with the respective fixture, current on the mains current line stops flowing. Such change on the mains current line may be detected, e.g., by the steady-state voltage supply unit. The steady-state voltage supply unit then changes the state of the first and second switching devices from conducting to non-conducting. Accordingly, the two ends of the LED retrofit lamp are insulated from each other, because no current may flow along the first and second switching devices along the mains current line. Thus, a user attempting to de-install the lamp according to a preferred embodiment of the invention does not risk receiving an electrical shock by touching the contacts at one end of the lamp if the other end of the lamp is still connected to power.

According to a further preferred embodiment, the steady-state voltage supply unit is adapted to provide said steady-state supply voltage to the first and second switching devices. The steady-state voltage supply unit is connected in-between said first and second switching devices. In particular, the first switching device and the steady-state voltage supply unit may be connected in series along the mains current path, and the steady-state voltage supply unit and the second switching device may be connected in series along the mains current path. That way, a current signal on the mains current line passes the first switching device before passing the steady-state voltage supply unit, and the current signal passes the steady-state voltage supply unit before passing the second switching device. Likewise, a current signal on the mains current line may pass the second switching device before passing the steady-state voltage supply unit, and the current signal may pass the steady-state voltage supply unit before passing the first switching device. An advantage of this preferred embodiment is that only basic insulation requirements must be met for the first and second switching devices. In particular, if the first switching devices comprises a first relay with a first coil and a first contact, and the second switching device comprises a second relay with a second coil and a second contact, the respective relay coil-to-contact paths must only meet basic insulation requirements.

According to a further preferred embodiment, the steady-state voltage supply unit comprises a shunt supply circuit adapted to tap energy from a mains current line of said LED lamp during a steady-state mode of operation. During startup (i.e., upon connecting power to both ends of the LED lamp), it is possible to provide the converted ignition voltage as the startup supply voltage to the first and second switching devices. That is to say, the ignition voltage is not necessarily directly provided to the switches, instead it is adapted for providing energy to close the two switches upon detection of ignition. However, in this case, it is further advantageous to provide circuitry which maintains the first and second switching devices in a conducting state, once the LED lamp is in a steady-state operation. This can be achieved by employing the steady-state voltage supply unit, which taps energy from the mains current line. The steady-state voltage supply unit preferably comprises a shunt supply circuit, which taps energy from the mains current line. Examples for possible implementations of a shunt supply circuit are described herein below.

According to a further preferred embodiment, the shunt supply circuit comprises
a full diode bridge and a shunt switch; and/or
an active full bridge comprising at least two diodes and at least two MOSFETs; and/or
an asymmetrical half-bridge.

When the switch (or the MOSFET) is in a conducting state, the mains current path is bypassed. When the switch (or the MOSFET) is n a non-conducting state (i.e., turned off), the main current may be used, e.g., to charge a filter capacitor. Accordingly, it is possible to regulate the low supply voltage by controlling the state of the switch (or of the MOSFET). The accordingly regulated supply voltage may then be used to provide energy to the switching devices. In particular, if the switching devices comprise first and second relays, the regulated supply voltage may provide energy to the respective relay coils. Preferably, the shunt supply circuit comprises an asymmetrical half-bridge, because such circuitry comprises fewer components and incurs less costs.

According to a further preferred embodiment, the startup voltage supply unit comprises a first capacitor coupled in parallel to the first switching device. The ignition detection unit comprises a second capacitor coupled in parallel to the second switching device. In particular, the first capacitor may serve to create the startup supply voltage, and the second capacitor may serve to detect an ignition phase of the HF driver, thereby generating a detection signal.

According to a further preferred embodiment, the first switching device comprises a first relay, and the second switching device comprises a second relay. The first and second relays may use, e.g., an electromagnet to operate a switching mechanism mechanically, but the skilled person is aware of other operating principles of relays as well. By employing first and second relays, it is possible to control the current flowing along the mains current line by a low-power signal, such as a supply voltage provided to first and second relays.

According to a further preferred embodiment, the first relay comprises a first coil, and the second relay comprises a second coil. The first and second coils are connected to receive said startup supply voltage from said switch drive unit. The first and second relays change from a non-conducting state to a conducting state upon receipt of said startup supply voltage from said switch drive unit.

According to a further preferred embodiment, the first and second switching devices are adapted to assume said conducting state if said startup supply voltage is above a minimum threshold voltage. The first and second switching devices may comprise, e.g., first and second relays, respectively. Preferably, the first and second relays are normally-open relays. Preferably, the first and second relays only close upon receiving a non-zero voltage, i.e., a voltage upon some minimum threshold value.

According to a further preferred embodiment, the LED lamp is adapted for operation with an electrical ballast, and said ignition voltage on said mains current line corresponds to an HF signal from said electrical ballast. By operating the LED lamp with an electrical ballast, the amount of current running through the LED lamp may be limited. Upon installing both ends of the LED lamp into their respective fixtures, the electrical ballast may provide an HF signal along the mains current line, which, in turn, may be detected as an ignition voltage by the ignition detection unit.

According to a further preferred embodiment, the ignition detection unit is adapted to detect the HF signal from said electrical ballast.

According to a further preferred embodiment, the switch drive unit is adapted to control said first and second switching devices to at least temporarily disconnect said LED unit from power. The switch drive unit is further adapted to control said first and second switching devices to at least temporarily connect said LED unit to power. By setting the first and second switching devices to a non-conducting state, the switch drive unit may control said first and second switching devices to at least temporarily disconnect said LED unit from power. By setting the first and second switching devices to a conducting state, the switch drive unit may control said first and second switching devices to at least temporarily connect said LED unit to power. Thus, the LED unit may be disconnected from power completely as long as the first and/or second switching devices are in a non-conducting state.

According to a further preferred embodiment, during a steady-state mode of operation, said startup voltage supply unit and said ignition detection unit are bypassed by the first and second switching devices. The startup voltage supply unit and the ignition detection unit are coupled in parallel to the first and second switching devices, e.g., along a mains current line of the lamp. Preferably, the startup voltage supply unit comprises a first capacitor and the ignition detection unit comprises a second capacitor. The first capacitor is, e.g., coupled in parallel to the first switching device. The second capacitor is, e.g., coupled in parallel to the second switching device. Upon inserting both ends of the LED retrofit lamp into its fixture and connecting an HF voltage, an HF current flows through the at least one capacitor. The HF current may provide an ignition voltage along the mains current line. The ignition voltage may then be detected by the ignition detection unit, e.g., by means of the second capacitor. In response, the first and second switching devices may be set to a conducting state by providing the startup supply voltage to the switching devices, provided a non-zero startup supply voltage has been generated. Current may then flow through the first and second switching devices rather than through the first and second capacitors.

According to a further preferred embodiment, if said first switching device is in a conducting state, said startup voltage supply unit is bypassed by the first switching device. Further, if said second switching device is in a conducting state, said ignition detection unit is bypassed by the second switching device. Setting the first and second switching devices into a conducting state requires the startup supply voltage on the one hand and the detection signal on the other hand. If the first switching device has failed and remains conducting, no startup supply voltage is generated. This is due to the startup voltage supply unit being coupled in parallel to the first switching device. In other words, if the first switching device fails (e.g., if the first switching device comprises a stuck relay), the startup supply voltage unit is bypassed by the first switching device such that no startup supply voltage can be provided to the first and second switching devices. In the case that the first switching device is stuck in a conducting state, the lamp will still not function, because the switch drive unit does not set the second switching device to a conducting state (because no startup supply voltage is provided to the second switching device). If, on the other hand, the second switching device has failed and remains conducting, no detection signal is generated. This is due to the ignition detection unit being coupled in parallel to the first switching device. In other words, if the second switching device fails (e.g., if the second switching device comprises a stuck relay), the ignition detection unit is bypassed by the second switching device such that no detection signal can be provided to the switch drive unit. In the case that the second switching device is stuck in a conducting state, the lamp will not function, because the switch drive unit does not set the first switching device to a conducting state (because the ignition detection unit does not provide a detection signal to the switch drive unit, and therefore, no startup supply voltage is provided to the first switching device).

According to a further preferred embodiment, the first second switching device comprises a first relay, and the second switching device comprises a second relay. Preferably, the first and second relays are normally open relays. By providing first and second relays in a normally open state, the first and second relays are normally non-conducting. In other words, if no startup or no steady-state supply voltage is applied to the relay coils, no current may flow along the mains current line of the LED retrofit lamp. However, if a startup supply voltage is applied to the relay coils, the first and second relays close and thereby change into a conducting state such that current may flow along the mains current line of the lamp.

In a second aspect of the invention, a method of operating an LED retrofit lamp with an alternating current is provided. The LED lamp comprises an LED unit, a first switching device and a second switching device, said first switching device, said second switching device, and said LED unit being connected in series. The method comprises the steps of generating a startup supply voltage if the first switching device is in a non-conducting state;
generating a detection signal if the second switching device is in a non-conducting state;
in response to said detection signal, providing said startup supply voltage to said first and second switching devices, wherein said first and second switching devices are adapted to assume a conducting state upon receipt of said startup supply voltage.

It shall be understood that the LED retrofit lamp of claim 1 and the method of operating an LED retrofit lamp of claim 15 have similar and/or identical preferred embodiments as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings.

DETAILED DESCRIPTION OF EMBODIMENTS

Figure 1:
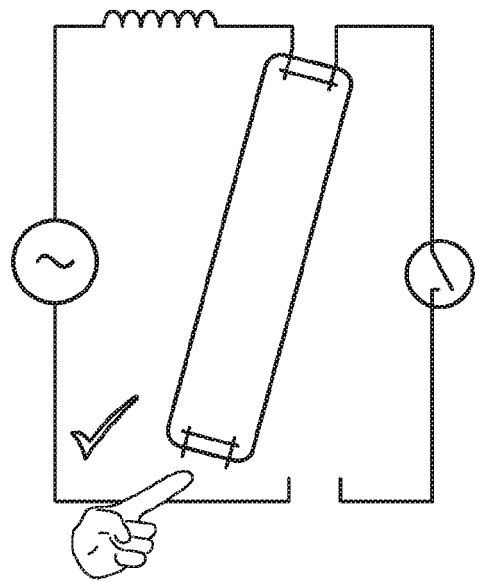
FIG. 1 shows schematically and exemplarily an example of a conventional TL-tube.

FIG. 1 shows schematically and exemplarily an example of a conventional TL-tube. Conventional TL tube lamps are safe due to the fact that the gas inside the tube first has to be ignited before there is a conducting path between the two connections on the end of the tube. Ignition is carried out via a combination of starter and ballast or a HF generated high voltage. This safety is necessary when the tube is being installed into a fixture while the voltage is not disconnected from the mains. In the situation when the lamp is not inserted correctly (e.g., one side inserted and the other not yet), the one side of the lamp is connected to live mains and the electrical contacts of the other side are insulated from the live mains. As illustrated by FIG. 1, the pins of a conventional TL-Tube are safe to touch.

Figure 2:
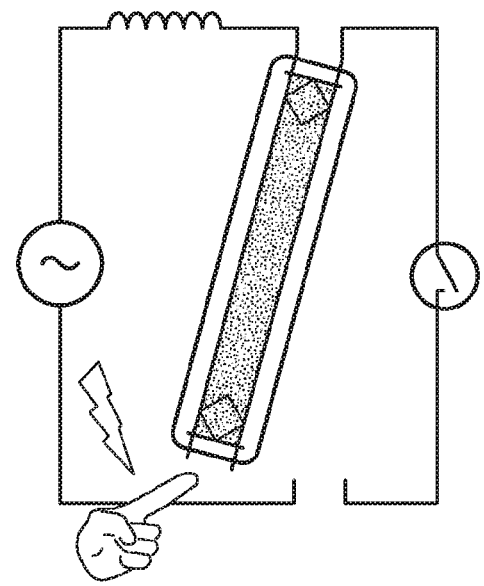
FIG. 2 shows schematically and exemplarily an example of a retrofit TL-tube with LEDs and electronics.

However, upon using LED-based lamps, such as LED-based retrofit lamps, there is a conducting path between the electronics in the two ends of the tube. Thus, safety is not guaranteed. This is illustrated by FIG. 2, which shows a retrofit TL-Tube (TLED) comprising LEDs and electronics (i.e., LED driver). The LEDs and the driver do not provide sufficient protection against electrical shock of touching the pins.

Figure 3:
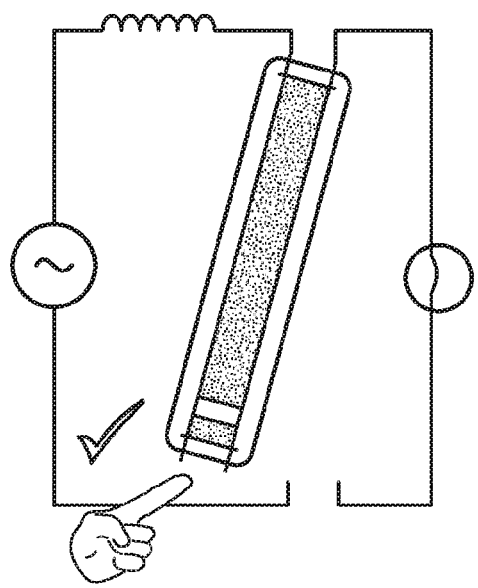
FIG. 3 shows schematically and exemplarily an example of a retrofit TL-tube with isolated LEDs and electronics.

A known solution to this problem is illustrated in FIG. 3, showing a TL-retrofit with isolated electronics and LEDs. Power is taken from a first side of the tube, while the other side is isolated from the first side by employing a short between the two connections on that side.

Figure 4:
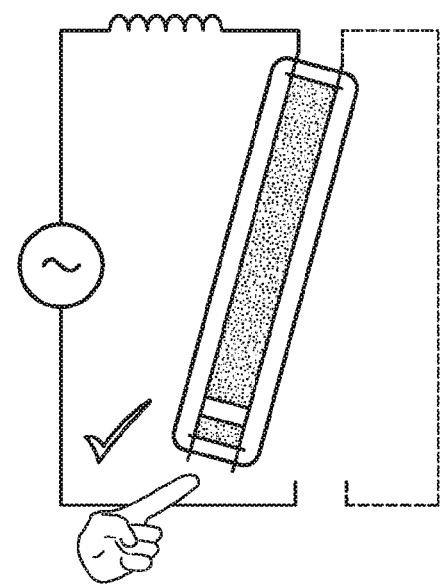
FIG. 4 shows schematically and exemplarily an example of a retrofit TL-tube with isolated LEDs and electronics on an HF ballast fixture.

In this case there is no conducting path between the two sides of the lamp. However, the starter must be replaced by a short (e.g., a fuse) in order to get the lamp working. Another disadvantage is that in the case of HF ballast there is neither a starter nor the wires for creating a short over the lamp without opening the fixture and implementing the short wires. This is time consuming and costly when switching over to the LED retrofit lamps. FIG. 4 illustrates how in a TL-retrofit with isolated electronics and LEDs on HF ballast fixture, rewiring is needed to make the lamp work.

There is increased interest in providing an HF ballast compatible TLED. In this regard, pin safety is one of the key challenges. A possible solution comprises electrical pin safety with a relay. An advantage of relay pin safety is its fool-proof use. Further, the look and feel of a normal lamp is maintained, since there are no buttons (e.g., mechanical safety switches) at the end cap.

Figure 5:
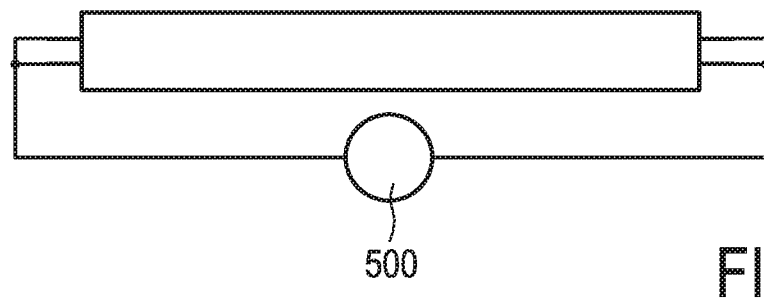
FIG. 5 shows schematically and exemplarily an example of testing the dielectric strength of an LED tube.

FIG. 5 illustrates an example setup to test the dielectric strength of the LED tube. As an example, a test voltage 500 may be applied to both ends of the tube in order to assess if breakdown or flashover occurs.

Figure 6A:
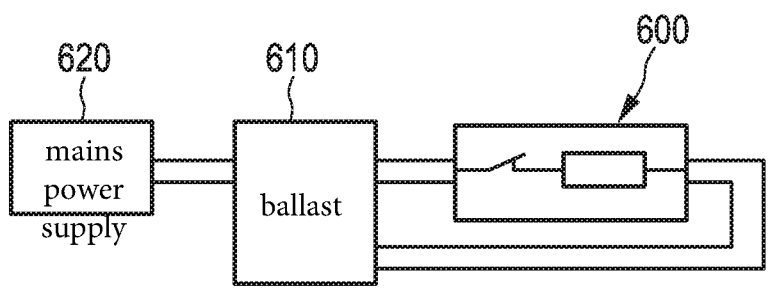
FIGS. 6A and 6B show schematically and exemplarily an example of a relay pin safety solution.
Figure 6B:
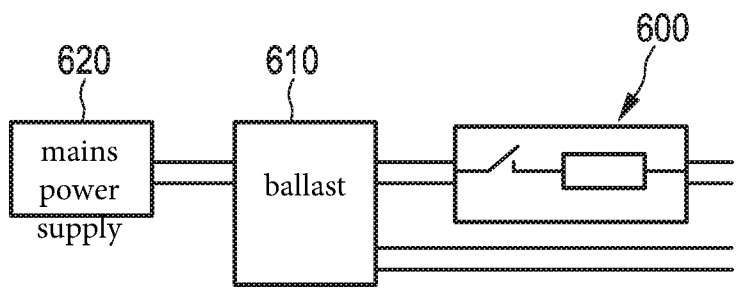

FIG. 6 illustrates the basic principle of providing pin safety with a relay. Lamp 600 comprises a relay inside and may be connected to HF ballast 610 and mains power supply 620, which is preferably a 230-V-mains power supply. The relay is closed when both ends of lamp 600 are energized (FIG. 6A) and stays open when only one end of the tube 600 is energized (FIG. 6B).

Particular interest resides in complying with the insulation requirements and providing a single fault safe solution. To date there are little electrical pin safety solutions on the market for HF compatible TLED that fulfill the requirement of reinforced insulation.

Figure 7:
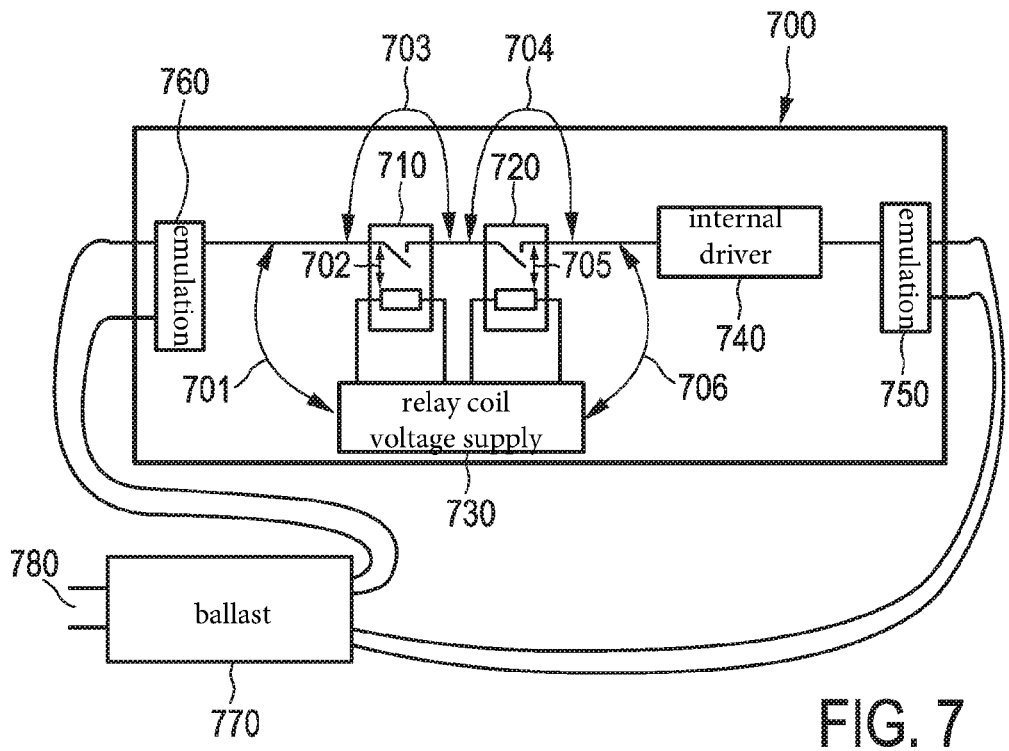
FIG. 7 shows schematically and exemplarily an embodiment of an LED retrofit lamp implementing a proposed TLED relay pin safety solution.

FIG. 7 shows a block diagram of the proposed TLED relay pin safety solution, illustrating the basic principle. Lamp 700 comprises LED load and internal driver 740, filament emulation circuitry 750, 760, and a relay pin safety circuit comprising first relay 710, second relay 720, and relay voltage supply 730. Lamp 700 needs to meet reinforced insulation requirements between the pins from one end to the other. A solution provides first and second switching devices (such as first and second relays 710, 720) and an insulated voltage supply 730 for the relay coils. Both relays 710, 720 are certified for basic insulation between the open contact and between the coil and contact.

There are multiple parallel paths 701, 702, 703, 704, 705, 706 between the two ends of the tube, e.g., via the two switches of the two relays, via the coil to contact of the first relay and low voltage supply to the driver and LEDs, via the switch of the first relay, contact-to-coil of the second relay, and low voltage supply to the driver and LEDs, via the left end to the low voltage supply, and to the driver and LEDs.

All those paths 701, 702, 703, 704, 705, 706 must meet reinforced insulation requirements. Reinforced insulation is provided by a single insulation system which provides a degree of protection against electric shock equivalent to double insulation. In other words, reinforced insulation can be constructed with two basic insulations. From FIG. 7, it can be seen that reinforced insulation may be achieved by constructing the circuit accordingly. The system is single fault safe, i.e., safe when bridging one of the insulation barriers.

The relay coil supply voltage may comprise an ignition detection that detects HF signal from ballast 770 (which is connected to mains power supply 780) and a steady-state supply voltage unit that may be derived from the ballast output current for supplying DC voltage to the first and second relay coils.

A relay suitable for a preferred embodiment must be released according to basic insulation requirements (with respect to insulation between coil and contact, and between the open contacts).

Relays 710, 720 stay open when only one side of lamp 700 is inserted. The main current can only flow, when both sides of lamp 700 are fully inserted in the lamp holders. If only one side of lamp 700 is inserted, the relay coil will not get a voltage and the open contact provides pin safety.

The relay contact switches the current from HF ballast 770. HF current from ballast 770 can, e.g., be detected via a Y-capacitor and provide initial voltage to power the relay coil, so that the contacts of first and second relays 710, 720 close. The supply is taken over by the steady state coil voltage supply 730.

Insulation barriers for relay coil voltage supply 730 can be constructed using safety components like transformers, Y-capacitor, etc. Examples are explained herein below.

Figure 8:
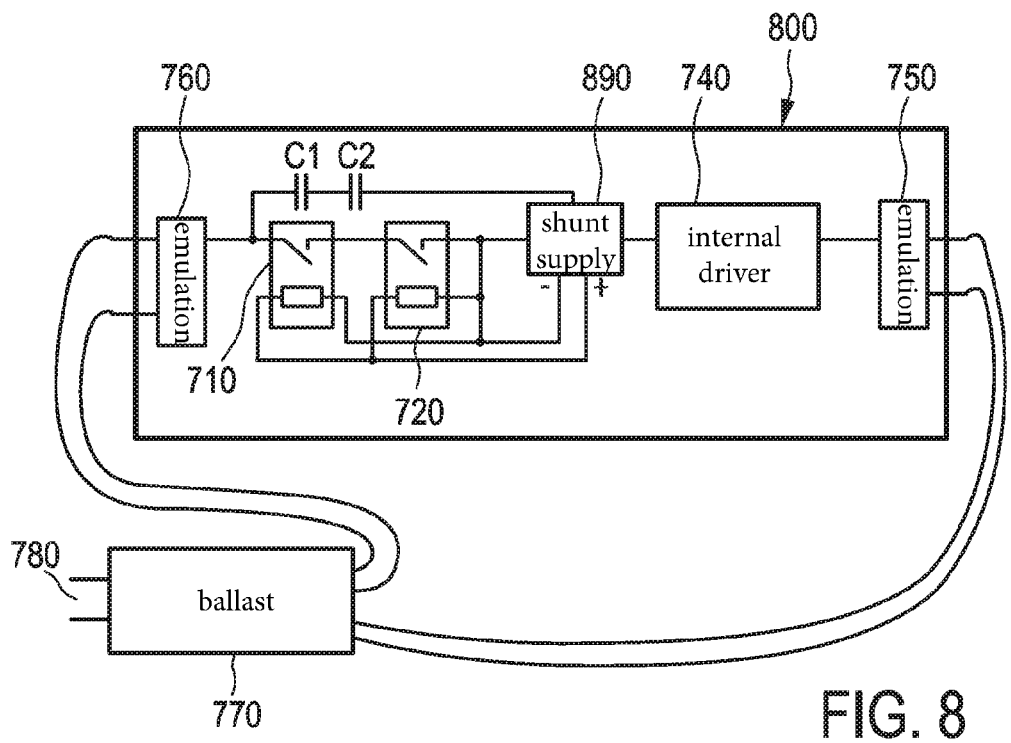
FIG. 8 shows schematically and exemplarily a further embodiment of an LED retrofit lamp implementing a proposed TLED relay pin safety solution.
Figure 11:
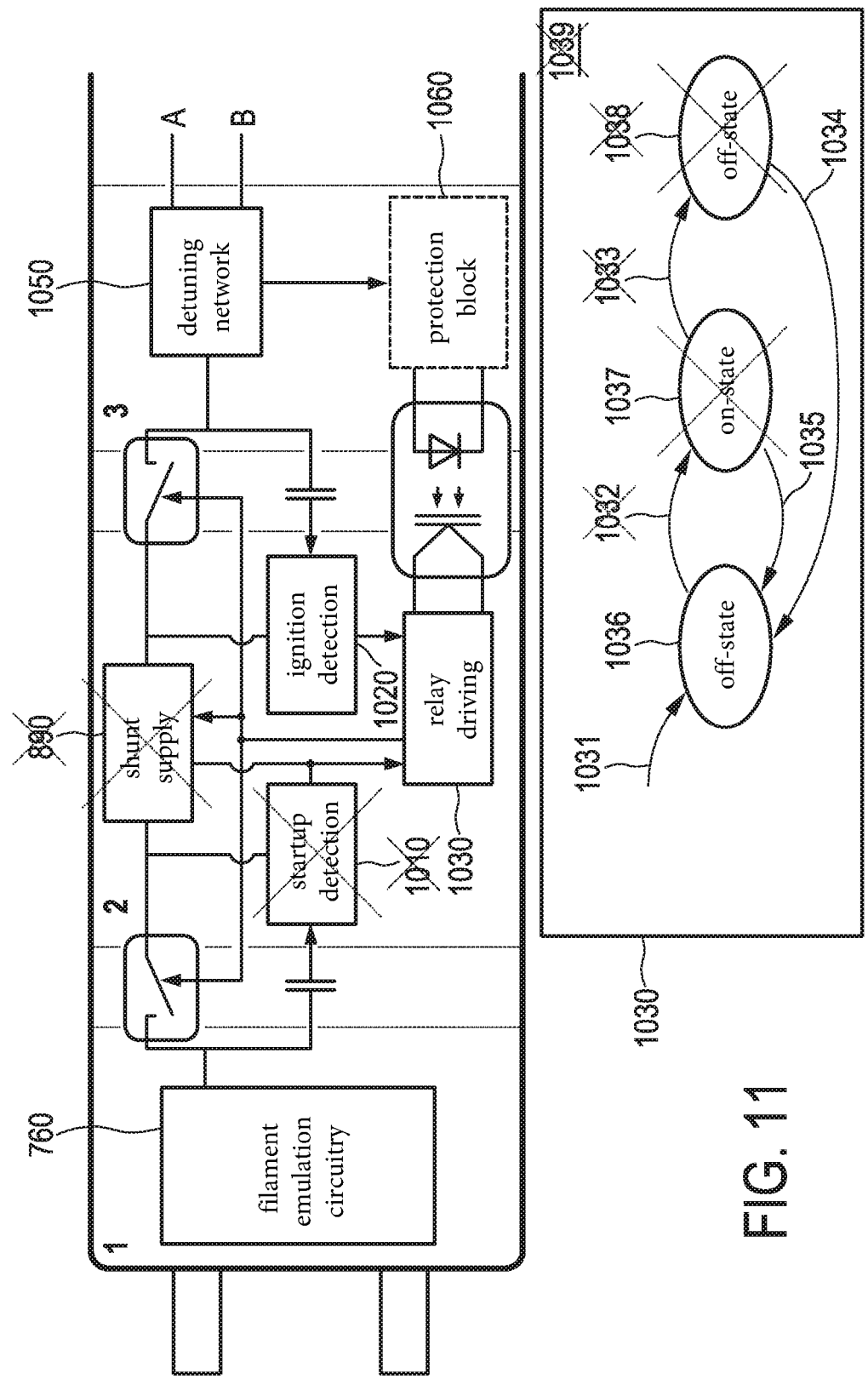
FIG. 11 illustrates a situation, where one of the switching devices is shorted.

FIG. 8 shows another example of implementing a relay pin safety into an LED lamp 800, which may preferably be a HF-compatible TLED 800 with a non-isolated shunt supply 890 for the relay coil. Relay voltage supply during startup phase is arranged via Y-capacitors C1, C2. Initial HF current flows via Y-capacitors C1, C2. This current energizes the coils of first and second relays 710, 720 and closes the respective contacts. In a steady-state operating mode, the relay coil supply voltage is derived by shunt supply 890 by tapping energy from the main current flow path by using a switching network (some examples of which are shown in FIG. 11). However, in this circuit the coil-to-contact path of the first relay 710 must meet reinforced insulation requirements. Capacitors C1 and C2 meet basic insulation requirements (i.e., C1 and C2 may be of Y-2 type). However, capacitors C1 and C2 may be replaced by a single capacitor (not shown), as long as the capacitor is of Y-1 type (i.e., providing reinforced insulation). The single capacitor is then connected in parallel with the string of two relays 710, 720.

Figure 9:
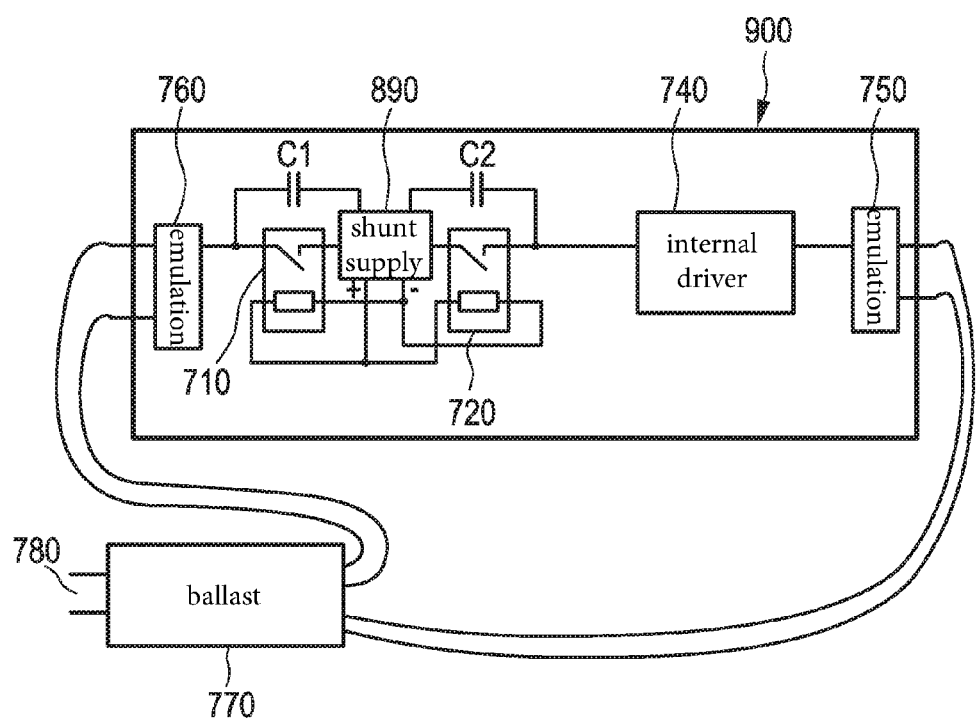
FIG. 9 shows schematically and exemplarily a further embodiment of an LED retrofit lamp implementing a proposed TLED relay pin safety solution.

Furthermore, the system can be implemented as illustrated by FIG. 9, showing relay pin safety for an LED lamp 900, which may preferably be an HF compatible TLED 900 with a non-isolated shunt supply 890 arranged in between the two relays 710, 720. The relay coil shunt voltage supply 890 is located between the two relays 710, 720. This setup provides the advantage that the relay coil-to-contact must meet only basic insulation requirements. In particular, capacitors C1 and C2 may be Y-capacitors. The principle of the circuit is similar to the one in FIG. 8.

The system meets reinforced isolation requirements. However, the relays still bridge each basic isolation barrier. A well-known failure mode of relays is a stuck contact. This by itself does not form a problem, since the setup only reduces to basic isolation. However, if the TLED remains functioning with a single shorted relay, there is no external indication of the failure and the product will continue to be used. If in time the second relay fails as well (e.g., as a short), no protection to the end user is left at all. Such condition is undesired.

To avoid this situation the circuit should detect whether one of the relays is shorted at start-up. If this is the case no drive signal should be applied to the relays. In this situation the TLED will not work with a shorted relay, thereby giving a clear indication of a problem to the end-user. No longer switching the relay will also avoid further degradation of the remaining relay avoiding the potential short condition.

Figure 10:
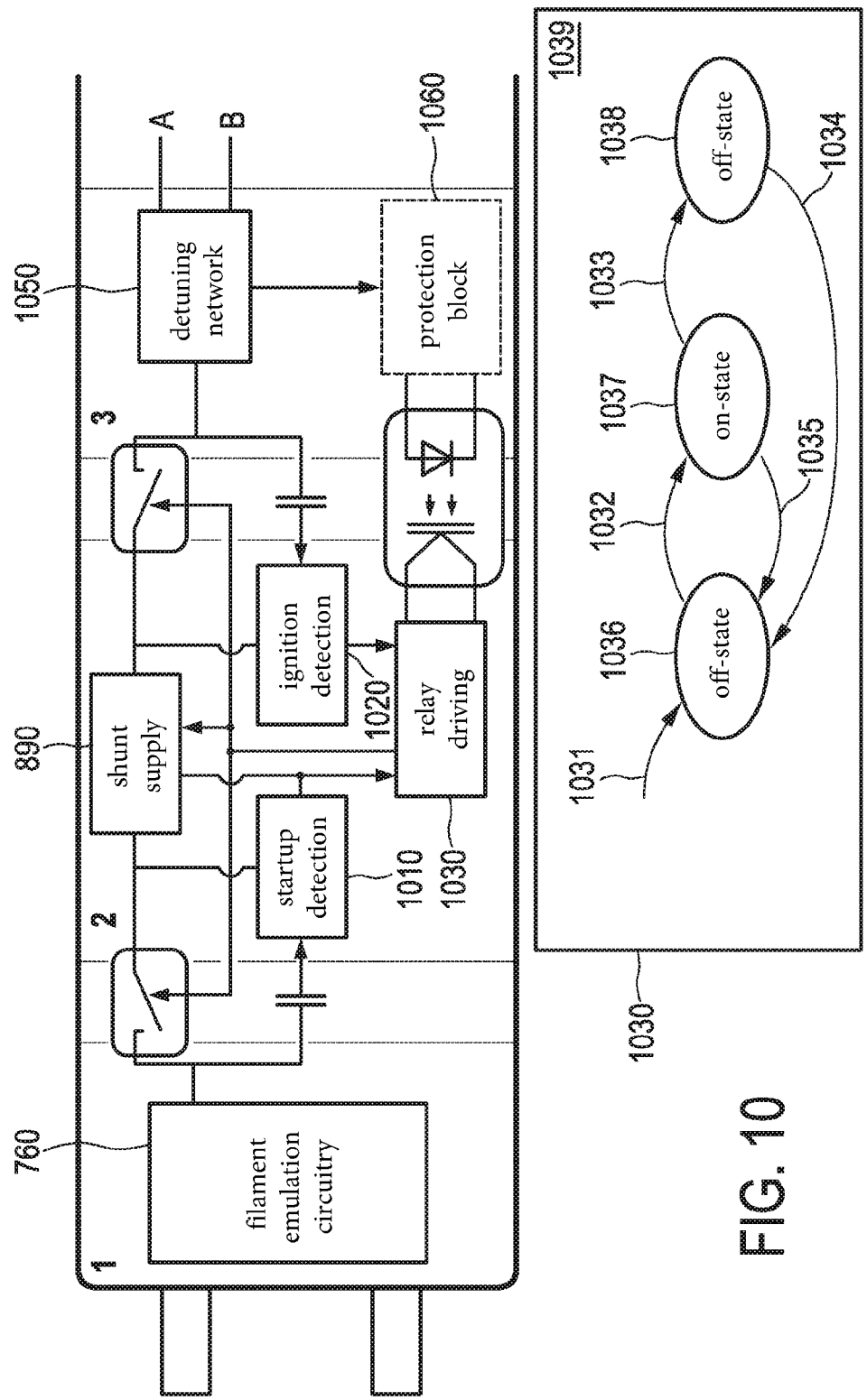
FIG. 10 shows schematically and exemplarily a further embodiment of an LED retrofit lamp implementing a proposed TLED relay pin safety solution.

A detailed drawing of a solution according to one aspect of the present invention is shown in FIG. 10. The figure focuses on the switching devices (e.g. relays) 710, 720 and their control circuits 1010, 1020, 1030. The basic circuit consists of three blocks 1, 2 and 3 with two basic isolation barriers in between. On top of the relay driving part 1030 an additional protection block 1060 and a detuning network 1050 are shown. Detuning network 1050 and protection block 1060 are both optional. They are there to provide protection against overcurrent, a DC offset in the lamp input current, open LED load, etc., and fault conditions. These failures may be detected via detuning network 1050 and protection block 1060. Upon detection the relays will be switched off to ensure product safety.

The basic trick in the implementation is the use of a first capacitor, between parts 1 and 2 to create the start-up power supply and of a second capacitor, between parts 2 and 3 to detect the ignition phase of the HF driver. The detection signal initiates the closing of the relays.

The lower part of FIG. 10 illustrates the operation of relay drive unit 1030. Upon startup 1031, the lamp is in an off-state 1036. If supply voltage and ignition detection 1032 are present, the lamp may be set to an on-state 1037. If a supply voltage is not present, the lamp will return to an off-state 1036 (step 1035). On the other hand, if a supply voltage is present, but the protection block registers an overly high current or a dc offset in the lamp input (step 1033), the lamp will be set to an off-state 1038. The supply voltage will then be disconnected from the relay coils and the lamp input current is interrupted. Consequently, the lamp returns to its initial off-state 1036 (step 1034). In this case, supply as well as protection 1039 are available. Off-states 1036 and 1038 are similar. But off-state 1038 corresponds to the situation where protection triggers and relay coil supply are disconnected. At that time there is still some energy left in shunt supply 890. This energy eventually dries out and the lamp returns to initial state 1036. During this process the lamp is actually in off-mode because the relays are in a non-conducting mode.

To close the relays, power generated with the capacitor between part 1 and 2 is needed. Thus, if the first switching device (e.g., relay 710) between parts 1 and 2 is shorted, startup voltage supply unit 1010 does not provide a startup supply voltage and driving the relays 710, 720 is not possible. A situation where relay 710 between parts 1 and 2 is shorted is illustrated in FIG. 11.

Figure 12:
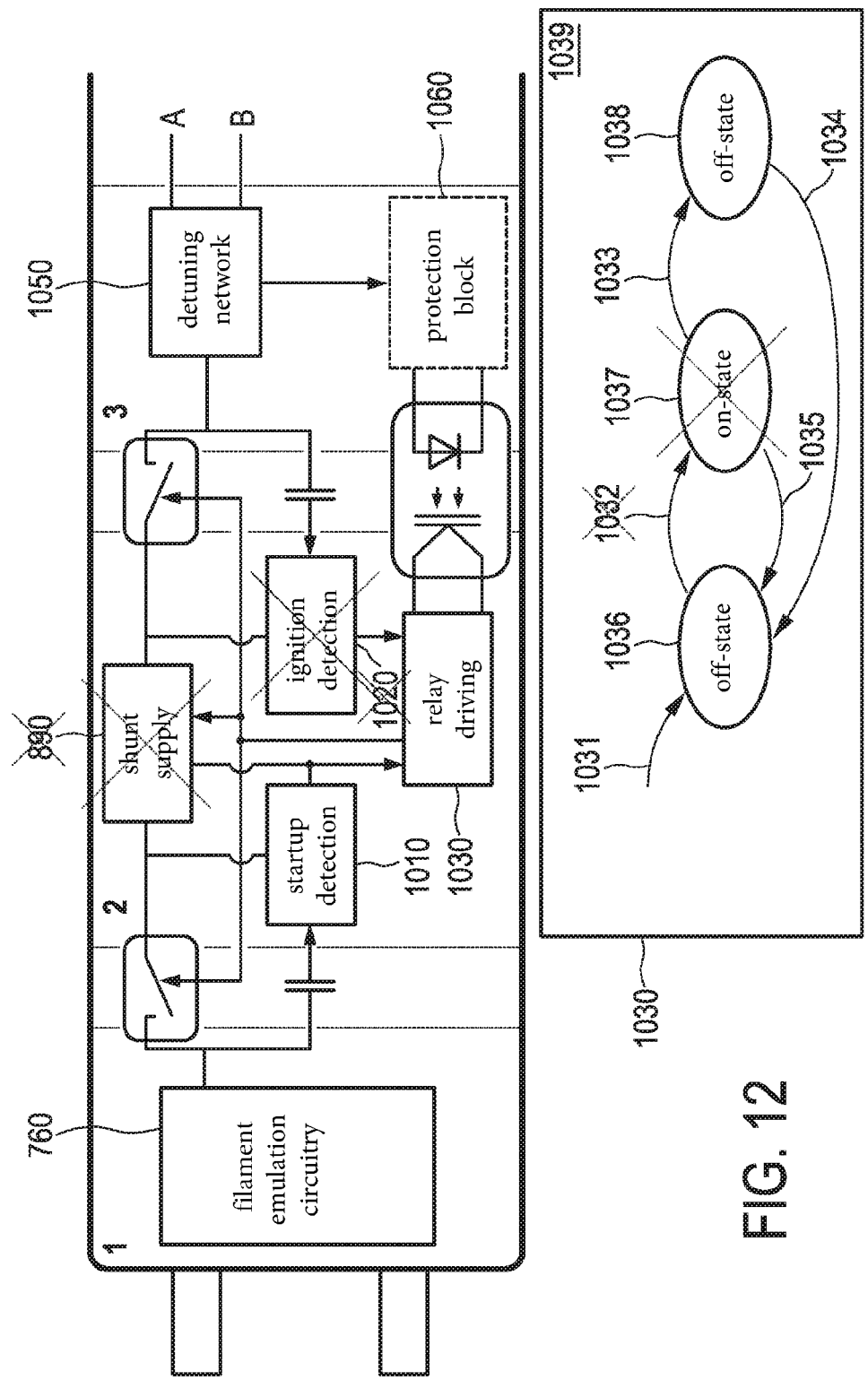
FIG. 12 illustrates a situation, where another of the switching devices is shorted.

If the second switching device (preferably comprising a second relay 720) between parts 2 and 3 is shorted, the capacitor between parts 2 and 3 is also bypassed. However, the capacitor between parts 2 and 3 is used by the ignition detection unit 1020 to detect the ignition phase. Accordingly, a startup supply voltage may be generated with the capacitor between parts 1 and 2, but the detection signal to drive the relays is missing. A situation where the relay between parts 2 and 3 is shorted is illustrated in FIG. 12.

Figure 13:
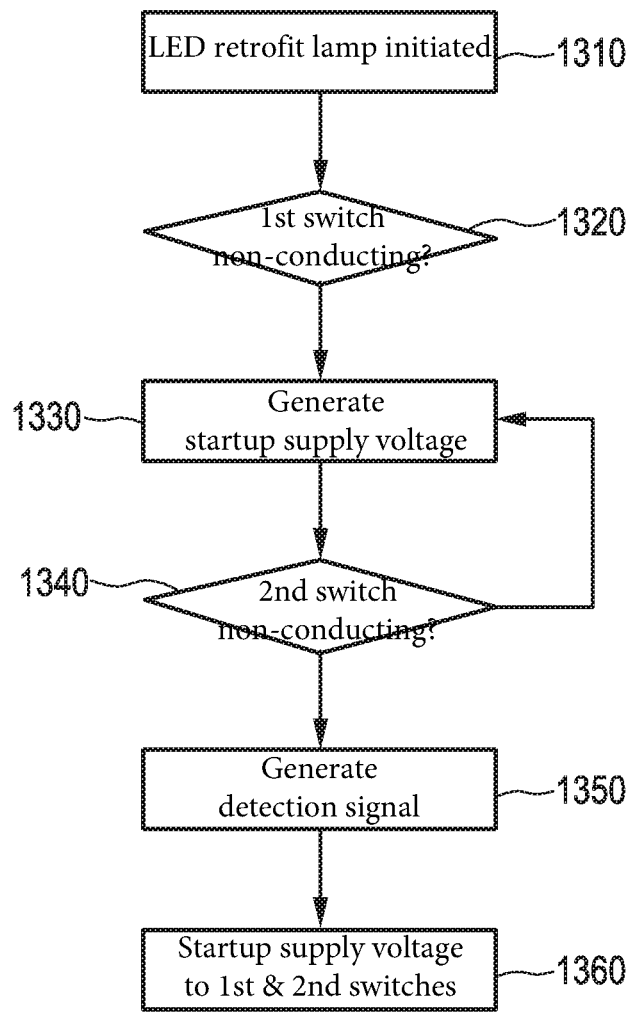
FIG. 13 shows a flowchart schematically and exemplarily illustrating an embodiment of a method of operating an LED retrofit lamp.

In the following an embodiment of a method of operating an LED retrofit lamp with an alternating current, said LED lamp comprising a LED unit, a first switching device and a second switching device, said first switching device, said second switching device, and said LED unit connected in series, will exemplarily be described with reference to a flowchart shown in FIG. 13.

In step 1310, the method of operating an LED retrofit lamp is initiated.

In step 1320, it is determined whether or not the first switching device is in a non-conducting state. In that case, the startup voltage supply unit described herein above is not bypassed by the first switching device.

If the first switching device is in a non-conducting state, a startup supply voltage is generated in step 1330, preferably by startup voltage supply unit.

In step 1340, it is determined whether or not the second switching device is in a non-conducting state. In that case, the ignition detection unit described herein above is not bypassed by the second switching device.

If the second switching device is in a non-conducting state, a detection signal is generated in step 1350, preferably by ignition detection unit.

In step 1360, the startup supply voltage is provided to the first and second switching devices in response to the detection signal. As described herein above, the first and second switching devices are adapted to assume a conducting state upon receipt of the startup supply voltage.

An example application of the invention relates to providing pin safety in any HF ballast compatible LED retrofit lamp for TL retrofit fixtures. The invention is particularly relevant for T8 LED tubes compatible with HF ballast.

The LED lamp can comprise any type of switching devices that allows changing between a conducting and non-conducting state.

Although in the above described embodiments, the switching devices comprise relays, these embodiments are preferred embodiments only and in another embodiment the switching devices can comprise, e.g., MOSFETs, Triac, IGBT, etc.

Although in the above described embodiments certain configurations of voltage supply units are shown, the invention is not limited to a certain configuration of voltage supply units. In an embodiment, the voltage supply unit does not comprise a rectifier, a filter capacitor, or a transformer.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like detecting an ignition voltage on the mains current line, detecting a reduction in power on the mains power line et cetera performed by one or several units or devices can be performed by any other number of units or devices. For example, the detection of an ignition voltage on the mains current line can be performed by a single unit of by any other number of different units. The determinations and/or the control of the LED lamp in accordance with the above described operating method can be implemented as program code means of a computer program and/or as dedicated hardware.

Any reference signs in the claims should not be construed as limiting the scope.

The present invention relates to an LED retrofit lamp adapted for operation with an alternating current. The LED lamp comprises an LED unit, first and second switching devices (e.g., first and second relays), a startup voltage supply unit coupled in parallel to the first switching device, an ignition detection unit coupled in parallel to the second switching device, and a switch drive unit for setting the first and second switching devices to a conducting state. If one of the first and second switching devices is shorted either no startup supply voltage or no detection signal is provided, such that the failure is indicated externally to a user.

The invention claimed is:

1. An LED retrofit lamp adapted for operation with an alternating current, comprising:
   an LED unit;
   a first switching device, and a second switching device; said first switching device, said second switching device, and said LED unit being connected in series;
   a startup voltage supply unit connected to a capacitor forming a parallel connection with said first switching device; said startup voltage supply unit adapted to generate a startup supply voltage if the first switching device is in a non-conducting state;
   an ignition detection unit connected to a capacitor forming a parallel connection with said second switching device, said ignition detection unit adapted to generate a detection signal if the second switching device is in a non-conducting state; and
   a switch drive unit adapted to provide said startup supply voltage to said first and second switching devices, in response to said detection signal, wherein said first and second switching devices are adapted to assume a conducting state upon receipt of said startup supply voltage.

2. The LED retrofit lamp according to claim 1, wherein said LED retrofit lamp further comprises a mains current line; said first switching device, said second switching device, and said LED unit being connected in series along said mains current line, said ignition detection unit adapted to generate said detection signal in response to detecting an ignition voltage on said mains current line.

3. The LED retrofit lamp according to claim 1, wherein said LED unit further comprises a steady-state voltage supply unit; said steady-state voltage supply unit being adapted to generate a steady-state supply voltage, wherein said steady-state voltage supply unit is further adapted to derive a steady-state supply voltage for said first and second switching devices from a mains current line of said LED retrofit lamp.

4. The LED retrofit lamp according to claim 3, wherein said steady-state voltage supply unit is further adapted to set said first and second switching devices at least temporarily to a non-conducting state in response to the power reduction on a mains current line of said LED lamp.

5. The LED retrofit lamp according to claim 3, said steady-state voltage supply unit being adapted to provide said steady-state supply voltage to the first and second switching devices, wherein said steady-state voltage supply unit is connected between said first and second switching devices.

6. The LED retrofit lamp according to claim 5, wherein said steady-state voltage supply unit comprises a shunt supply circuit adapted to tap energy from the mains current line of said LED retrofit lamp during a steady-state mode of operation.

7. The LED retrofit lamp according to claim 6, wherein said shunt supply circuit comprises at least one of:
   a full diode bridge and a shunt switch;
   an active full bridge comprising at least two diodes and at least two MOSFETs; and
   an asymmetrical half-bridge.

8. The LED retrofit lamp according to claim 1, wherein said first switching device comprises a first relay, and wherein said second switching device comprises a second relay.

9. The LED retrofit lamp according to claim 8, wherein the first relay comprises a first coil, and wherein the second relay comprises a second coil; wherein the first and second coils are connected to receive said startup supply voltage from said switch drive unit, wherein said first and second relays change from a non-conducting state to a conducting state upon receipt of said startup supply voltage from said switch drive unit.

10. The LED retrofit lamp according to claim 1, wherein said first and second switching devices are adapted to assume said conducting state if said startup supply voltage is above a minimum threshold voltage.

11. The LED retrofit lamp according to claim 1, wherein the LED lamp is adapted for operation with an electrical ballast, and wherein said ignition voltage on said mains current line corresponds to an HF signal from said electrical ballast.

12. The LED retrofit lamp according to claim 11, wherein said ignition detection unit is adapted to detect the HF signal from said electrical ballast.

13. The LED retrofit lamp according to claim 1, wherein, if said first switching device is in a conducting state, said startup voltage supply unit is bypassed by the first switching device, and wherein, if said second switching device is in a conducting state, said ignition detection unit is bypassed by the second switching device.

14. A method of operating an LED retrofit lamp with an alternating current; said method comprises the steps of:
   generating a startup supply voltage if a first switching device, which is included in the LED retrofit lamp, is in a non-conducting state;
   generating a detection signal if a second switching device, which is included in the LED retrofit lamp, is in a non-conducting state, wherein the first and second switching devices are connected in series with an LED unit in the LED retrofit lamp; and
   in response to said detection signal, providing said startup supply voltage to said first and second switching devices, wherein said first and second switching devices are adapted to assume a conducting state upon receipt of said startup supply voltage.

* * * * *